(12) United States Patent
Haruta (10) Patent No.: US 6,502,811 B1
(45) Date of Patent: Jan. 7, 2003

(54) BINDING METAL FOR COVERING WITH HEAT-SHRINKABLE SHEET

(75) Inventor: Hideo Haruta, Osaka (JP)

(73) Assignee: Sumitomo Electric Fine Polymer, Inc., Osaka (JP)

( * ) Notice: Subject to any disclaimer, the term of this patent is extended or adjusted under 35 U.S.C. 154(b) by 0 days.

(21) Appl. No.: 09/570,542

(22) Filed: May 12, 2000

(51) Int. Cl.⁷ .................................. B25B 1/00
(52) U.S. Cl. .................. 269/254 R; 269/287
(58) Field of Search ................ 267/158, 182; 411/430; 224/674; D8/395; 285/319; 269/254 R, 287

(56) References Cited

U.S. PATENT DOCUMENTS

| | | | | |
|---|---|---|---|---|
| D161,143 S | * | 12/1950 | Walters | D8/395 |
| D199,348 S | * | 10/1964 | Mussy | D8/395 |
| D208,105 S | * | 7/1967 | Haber | D8/395 |
| D218,144 S | * | 7/1970 | Branson | D8/395 |
| 3,741,592 A | | 6/1973 | Muncy | |
| D229,743 S | * | 1/1974 | Moore | D8/395 |
| D293,885 S | * | 1/1988 | Carlmark | D8/395 |
| D410,573 S | * | 6/1999 | McKibbin | D8/395 |

FOREIGN PATENT DOCUMENTS

| | | |
|---|---|---|
| DE | 94 00 392 | 9/1994 |
| FR | 1499592 | 10/1967 |
| FR | 2422275 | 11/1979 |
| JP | 57-169527 | 5/1987 |
| JP | 1-48860 | 10/1989 |

* cited by examiner

Primary Examiner—Robert C. Watson
(74) Attorney, Agent, or Firm—McDermott, Will & Emery (57) ABSTRACT

A binding metal for covering an object with a heat-shrinkable sheet and holding the heat-shrinkable sheet in a state in which both end portions of the sheet face each other. The binding metal has two long members holding the heat-shrinkable sheet, and these long members have an opening and closing portion at one end portion such that when the long members are substantially parallel, the distance between the long members at the opening and closing portion is wider than that of the intermediate portion, and a clamping force is applied to the heat-shrinkable sheet by closing the opening and closing portion. By forming to the binding metal a deformed portion of a form fitting an irregular portion of an object to be covered, the object can be covered with a heat-shrinkable sheet without forming a gap.

5 Claims, 5 Drawing Sheets

BINDING METAL FOR COVERING WITH HEAT-SHRINKABLE SHEET

FIELD OF THE INVENTION

The present invention relates to a binding metal with a heat-shrinkable sheet, the production method thereof, and a covering method with a heat-shrinkable sheet.

BACKGROUND OF THE INVENTION

To maintain the insulating property, the corrosion resistance, the water resistance of an object to be covered, such as a metal pipe, a cable, etc., covering the object to be covered with a heat-shrinkable sheet and shrinking the sheet by heating has been thus far widely carried out. In this case, to hold the heat-shrinkable sheet, the following techniques are proposed.

(1) Japanese Utility Model Laid-Open No. 169527/1982: The invention is a technique of covering an object with a heat-shrinkable sheet, and heat-shrinking the same in a state that end portions of the heat-shrinkable sheet are held between a pair of rod-form members and also are fixed by holding the rod-form members by a clip.

(2) Japanese Patent Publication No. 48860/1989: The invention is also a technique of covering an object with a heat-shrinkable sheet and holding the end portions of the heat-shrinkable sheet by a pair of rod-form members. In this case, both end portions of the heat-shrinkable sheet facing each other by binding both end portions with a wire together with the object to be covered are pushed to the side of the object. Furthermore, the heat-shrinkable sheet is held by clamping the rod-form members by a clip, and the heat-shrinkable sheet is heat-shrunk in this state.

However, a clip is required to obtain a clamping force in each of the above-described techniques, because the rod-form members have a straight-line form. Therefore, the number of parts is increased, whereby the workability at fixing the heat-shrinkable sheet is poor. Particularly, in the above-described technique (2) of the prior art, binding with a wire is necessary, which makes the work complicated.

Also, because a clip has a large heat capacity, it becomes a hindrance for heating and cooling. That is, there are problems in which at heating, the clip shields the hot blast of the heating torch lamp and also after heating, requires a period of cooling of the clip.

Also, because the wire binding in the above-described technique (2), winds the rod-form members together with the object to be covered, when the object is a polyethylene-covered pipe, etc., the polyethylene cover is softened by the heat at heating the heat-shrinkable sheet whereby it is a possible that the wire may enter the softened cover.

Furthermore, in each of the above-described techniques, when there exist irregular portions on the surface of an object to be covered, it is difficult to shrink a heat-shrinkable sheet along the object and a gap is formed between the object and the heat-shrinkable sheet.

SUMMARY OF THE INVENTION

Accordingly, the main object of the invention is to provide a. binding metal for covering an object with a heat-shrinkable sheet, which can cover even an object having irregular portions on the surface thereof with a heat-shrinkable sheet without forming gaps and further carry out the operation with good workability, a production method of the binding metal, and a covering method with a heat-shrinkable sheet.

The binding metal of the invention is a binding metal for covering an object with a heat-shrinkable sheet and holding them in a state that both end portions of, the sheet face each other, and has two long members holding the heat-shrinkable sheet between them. These long members have an opening and closing portion at one end portion such that when the long members are substantially parallel, the distance between the long members at the opening and closing portion is wider than that at the intermediate portion. That is, at least one end portion of the long members is formed apart from each other. Also, a clamping force is applied to the heat-shrinkable sheet by closing the opening and closing portion.

A rod-form material or a belt-form material is suitable as the material constituting the binding metal. As the material constituting the binding metal, a metal having a proper rigidity is preferred. For example, a wire can be utilized.

Also, as a practical embodiment of "when the long members are substantially parallel, the distance between the long members at the opening and closing portion is wider than that at the intermediate portion ", there is a case that one end portion of each of long member is bent at an angle and a case that both end portions are bent at an angle. Furthermore, the long members may be formed in circular arc.

In the binding metal, a heat-shrinkable sheet is inserted between the long members in the state that at least the end portions thereof are apart from each other, and holds both end portions of the long members, then the heat-shrinkable sheet is clamped. This case requires holding both end portions of the long members when the two long members are independent and sometimes the process of inserting the heat-shrinkable sheet is difficult. Thus, one end of the long members may be connected. That is, the binding member has the form of folding from one long member to the other long member via the connected portion.

The binding metal is, as a matter of course, used for an object to be covered having no irregular portion, for example, a rod-form material having a diameter in the lengthwise direction, but can be effectively utilized for an object to be covered having irregular portion(s) on the surface thereof. That is, when an object to be covered has an irregular portion, it is desirable to form a deformed portion formed almost fitting the irregular portion of the object to the long members, which extends to the opening and closing portion. At least a part of the deformed portion is projected from the face of the opening and closing portion making the opening or closing action.

By holding the binding metal of both end portions of a heat-shrinkable sheet, from the initiation of heating to the completion of heating, the heat-shrinkable sheet can be held in the form almost fitting the irregular portion of the object, and the formation of a gap between the heat-shrinkable sheet and the object to be covered can be restrained.

To hold the opening and closing portions in a closed state, a hooking portion is formed on an end portion of at least one long members in the opening and closing portions, and by engaging the end portion of the other member in the opening and closing portion, the portion may be maintained in the closed state. For example, there is a construction that the end portion of one of the long members is bent in a U-form and the end portion of the other long member is hooked by the U-formed portion. In other embodiment, a ring may be put over the peripheries of the long members.

Also, the production method of the binding metal for applying a heat-shrinkable sheet of the invention relates to a method of producing a binding metal using a long member of a circular arc, and includes a step of forming a long member in a circular arc and a step of folding the long member formed in a circular arc at about the center thereof such that both end portions of the long member are apart from each other. According to the production method, a binding metal can be produced in less process steps as compared with the case of bending long members.

On the other hand, the covering method of the invention is a method of covering an object having a small diameter portion and a large diameter portion with a heat-shrinkable sheet, which includes:

(1) a step of placing an adhesive in the heat-shrinkable sheet at a position corresponding to the small diameter portion;

(2) a step covering an object with the heat-shrinkable sheet with adhesive in contact with at least part of the small diameter portion;

(3) a step of holding the heat-shrinkable sheet with the above described binding metal in a state in which both end portions of the heat-shrinkable sheet are facing each other; and (4) a step of shrinking the heat-shrinkable sheet by heating.

By the covering method of the invention, even an object to be covered having a small diameter portion and a large diameter portion can be securely covered by the heat-shrinkable sheet without forming gaps between the small diameter portion and the heat-shrinkable sheet. Particularly, it is desirable that by placing an adhesive, the portion between the small diameter portion and the large diameter portion is formed in a tapered form as gentle as possible. In addition, "by placing an adhesive " includes the case of attaching an adhesive sheet (tape) in addition to the case of coating an adhesive.

BRIEF DESCRIPTION OF THE DRAWINGS

FIG. 2A is a plain view of the whole body, FIG. 2B is a side view showing a short shaft, and FIG. 2C is a side view showing a long shaft, FIG. 5A is a plain view and FIG. 5B is a side view, FIG. 6A is a view showing a test method of determining the influence of the difference in the diameter of a ring to the clamping force, and FIG. 6B is a view showing a test method of determining the relation of the difference of the bend radius of a circular arc and the clamping force.

DETAILED DESCRIPTION OF THE INVENTION

Then, the present invention is described in detail.

First, the embodiment of the invention is described in the case of covering a CATV connector with a heat-shrinkable sheet.

Figure 1:
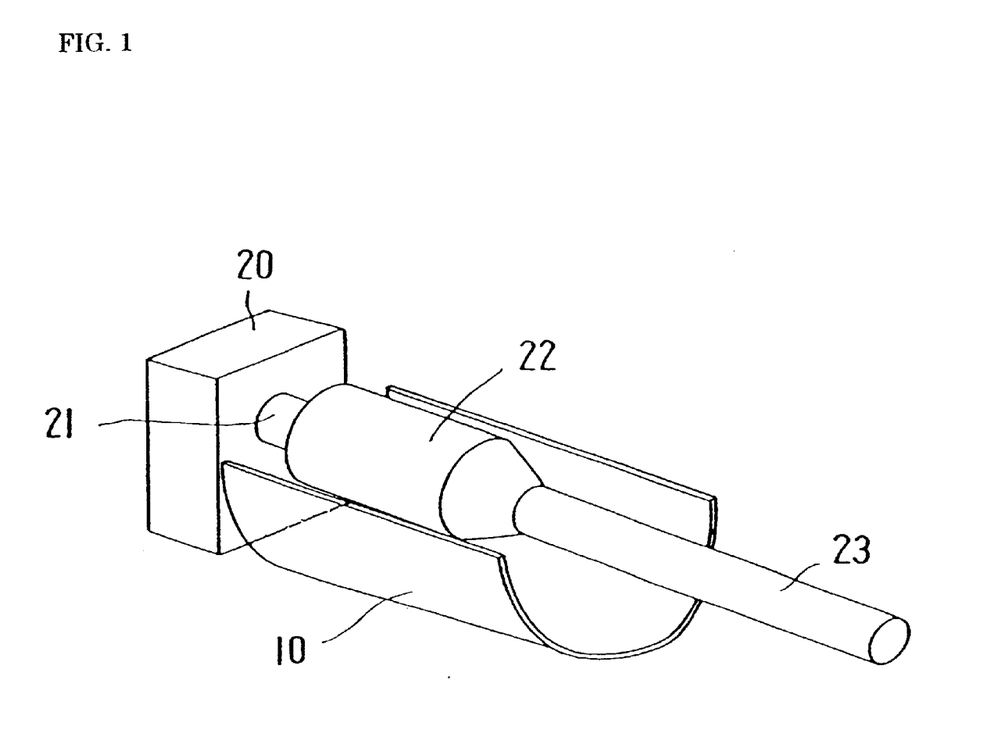
FIG. 1 is a view showing the steps of covering an object to be covered with a heat-shrinkable sheet.

FIG. 1 is a view showing the case of covering using the binding metal of the invention. In the object to be covered, a cable 23 is connected to a CATV instrument 20 via a connector end portion 21 and a CATV connector 22. The CATV connector 22 is a large diameter portion and the connector end portion 21 and the cable 23 are small diameter portions. In these portions, the portion from the intermediate of the connector end portion 21 to the intermediate of the cable 23 is covered with a heat-shrinkable sheet 10. Between the connector 22 of the large diameter portion and the connector end portion 21 of the small diameter portion, there is a difference in level of about a right angle and whether or not the portion of the difference in level can be covered with a heat-shrinkable sheet without forming a gap is of particular importance. The dimension of each portion of the object to be covered is as follows:

Outside diameter of the connector end portion: 20 mm

Outside diameter of the CATV connector: 27 mm

Outside diameter of the cable: 14 mm

Figure 3:
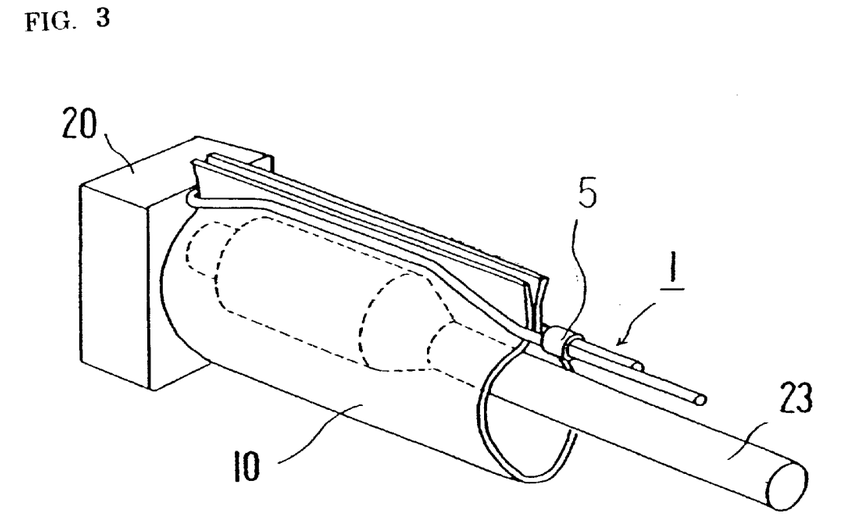
FIG. 3 is a view showing the state of mounting the binding metal of the invention on a heat-shrinkable sheet.

The binding metal used for covering is shown in FIG. 3. The binding metal is formed by bending a stainless steel wire and possesses a deformed portion of the form fitting the outer form of the CATV connector, and opening and closing portions 3 for clamping the deformed portion 2.

The deformed portion 2 is a portion of folding the stainless steel wire and maintaining the parallel state, and is formed in an about "[" form. Forming in the "[" form is for deforming in the form almost fitting the irregular portions of the object to be covered. In this case, the deformed form fitting the irregular form of the object to be covered is not necessarily strict. In addition, between the stainless steel wires placed in parallel, a small gap 4 is formed.

Figure 4:
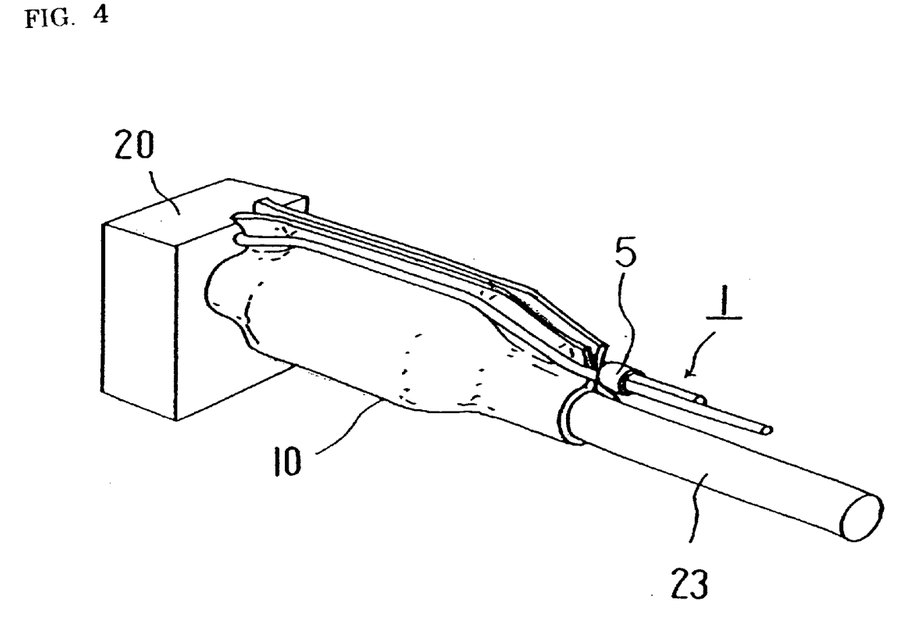
FIG. 4 is a view showing the step after shrinking the heat-shrinkable sheet.

Also, the opening and closing portion 3 extends to the deformed portion 2 and usually is formed in an opened V-form state. By closing both end portions, the deformed portions 2 are clamped. In the example, one of the opening and closing portions 3 is constituted of a long shaft 3A and the other is constituted of a short shaft 3B. When the long shaft 3A and the short shaft 3B are closed, it is necessary to hold both shafts in a closed state and there is no particular restriction on the means. For example, there is a case of holding by putting a ring 5 over the long shaft and the short shaft as shown in FIGS. 3 and 4. In this case, it is preferred that the tip of the long shaft 3A is folded in an L-form, whereby detaching of the ring 5 can be prevented at working. As the ring, a coil spring may be used. In the example, one of the opening and closing portions is a long shaft 3A and the other is a short shaft 3B but this is only for forming a ring detaching preventing mechanism and both shafts may be the same length. In addition, in the opening and closing portion 3 of FIG. 2, each end portion is a straight line form but the portion may be so constructed that, for example, the end portion of the long shaft 3A (or short shaft 3B) is bent in a U-form and the long shaft 3A and the short shaft 3B are kept in a closed state by hooking the U-form portion to the short shaft 3B (or long shaft 3A), whereby the ring 5 and a spring, etc., as described above can be omitted, which is economical.

Figure 6:
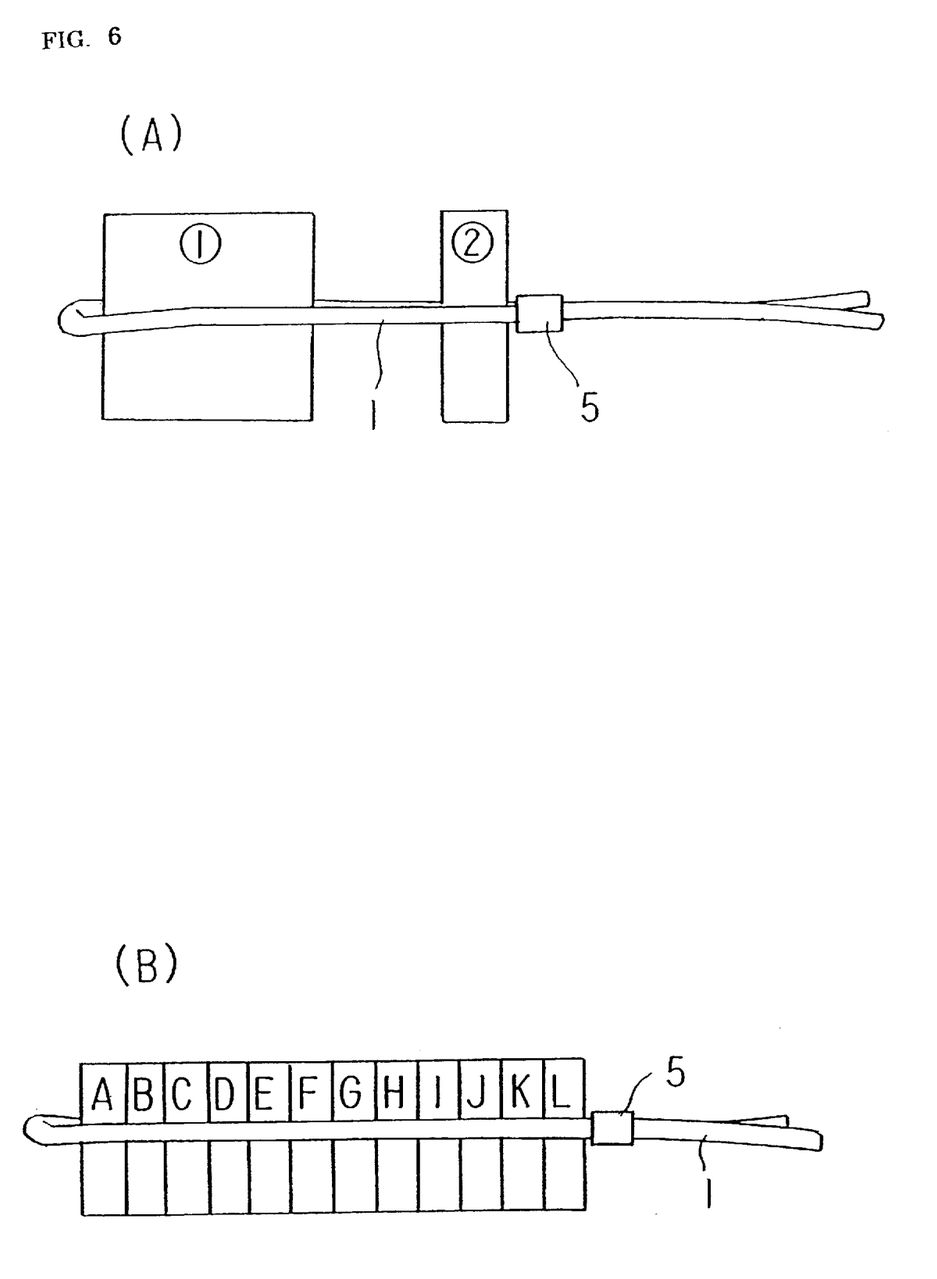
FIG. 6 shows the test method of a clamping force using the binding metal of FIG. 5.

Also, at least a part of the deformed portion 2 is projected from the face in which the opening and closing portion makes an opening or closing action. That is, the deformed portion 2 is formed projecting from the face including the long shaft 3A and the short shaft 3B, each of the long shaft and short shafts comprising elongated portions f, as shown in FIGS. 3(B), 3(C) and 6(B). By disposing the opening and closing portion 3 and the deformed portion 2 on a non-straight line as described above, the heat-shrinkable sheet covering the object can be held in the state fitting the irregular portions of the object.

The dimensions of each portion of the binding metal are shown below.

Deformed Portion:
  Length a of the tip portion: 14 mm
    Angle θ1 of the tip portion: 23°
  Length b of the intermediate portion: 25 mm
  Length c of the root portion: 17 mm
    Angle θ2 of the root portion: 24°
  Distance d of the intermediate portion and the opening and closing portion: 7 mm
  Distance e of the intermediate portion and the end of the tip portion: 5.5 mm
  Bend radius r of the bent portion (connected portion): 1.5 mm Opening and Closing Portion:
  Length of the long shaft 3A: 114 mm
  Length of the short shaft 3B: 94 mm
  Angle θ3 of the long shaft and the short shaft: 10°

(Test Example 1)

A CATV connector was covered with a heat-shrinkable sheet using the binding metal as described above. In this case, by changing the diameter of the stainless steel wire of the binding metal and the size of the heat-shrinkable sheet, the workability in the case of inserting the heat-shrinkable sheet into the deformed portions and the profitability of the shrinking property of the cover were determined. The heat-shrinkable sheet is a sheet of, for example, crosslinked polyethylene imparted with a heat-shrinking property by uniaxially stretching in the width direction, and it is preferred that the inside surface of the sheet is coated with a hot-melt type adhesive. Also, the sizes of the heat-shrinkable sheet are shown by the length before and after shrinking of the case of shrinking in a free state. Each length is a length in shrinking direction, also, the thickness of the sheet are shown by the thickness before and after shrinking in the case of shrinking in a free state.

The test was carried out as follows. First, the heat-shrinkable sheet is wound round the object to be covered (FIG. 1). In this case, the heat-shrinkable sheet is disposed such that one side edge of the heat-shrinkable sheet is placed at the upper portion of the connector end portion and the other side edge of the heat-shrinkable sheet is placed at the upper portion of the cable, and the shrinking direction of the heat-shrinkable sheet is set to the peripheral direction of the object to be covered. Then, both end portions of the heat-shrinkable sheet are facing each other, and in such state, the binding metal is mounted from the one side edge of the heat-shrinkable sheet (the side of the CATV instrument) (FIG. 3). The opening and closing portion of the binding metal 1 is opened slightly to widen the distance between the parallel portion of the deformed portions and the facing heat-shrinkable sheet 10 was inserted between the deformed portions of the binding metal 1. In this case, the position of the binding metal is adjusted so that the deformed portions are disposed at about the upper portion of the CATV connector. Also, the heat-shrinkable sheet 10 is shrunk by heating to form a cover (FIG. 4).

The test conditions and the test results are shown together in Table 1.

TABLE 1

| No. | Heat-shrinkable sheet (mm) | | | | Diameter of steel wire (mm) | Gap of the held portion (mm) | Workability | Shrink-coating property |
|---|---|---|---|---|---|---|---|---|
| | Before shrinking | | After shrinking | | | | | |
| | Length | Thickness | Length | Thickness | | | | |
| 1-1 | 110 | 0.9 | 35 | 3.3 | 1.5 | 0.2 | Good | Entered inside, NG |
| 1-2 | 130 | 1.0 | 40 | 3.4 | " | " | Good | Entered inside, NG |
| 1-3 | 150 | 1.1 | 45 | 3.5 | " | " | Good | Entered inside, NG |
| 1-4 | 110 | 0.9 | 35 | 3.3 | 2.0 | " | Hard to insert | Good |
| 1-5 | 130 | 1.0 | 40 | 3.4 | " | " | Good | Good |
| 1-6 | 150 | 1.1 | 45 | 3.5 | " | " | Good | Good |
| 1-7 | 110 | 0.9 | 35 | 3.3 | 2.5 | " | Hard to insert | Gap formed at the cable side |
| 1-8 | 130 | 1.0 | 40 | 3.4 | " | " | Good | Gap formed at the cable side |
| 1-9 | 150 | 1.1 | 45 | 3.5 | " | " | Good | Good |
| 1-10 | 110 | 0.9 | 35 | 3.3 | 3.0 | 1.4 | Hard to insert | Entered inside, NG |
| 1-11 | 130 | 1.0 | 40 | 3.4 | " | " | Good | Entered inside, NG |
| 1-12 | 150 | 1.1 | 45 | 3.5 | " | " | Good | Good |

As shown in Table 1, when the diameter of the stainless steel wire was 1.5 mm, the wire was too fine and the clamping force in the deformed portion was weak. Thereby, the sheet slipped to move the side of the object to be covered from the deformed portions accompanied by shrinking of the sheet and the object could be not be covered adequately (in the table, described "Entered inside, NG").

On the other hand, when the diameter of the wire was 2 mm, the workability was tolerable and the shrinking property of the cover was good without forming a gap between the objects and the cover. In this case, however, in No. 1-4, when the object was covered by the heat-shrinkable sheet, particularly, the workability of the insertion of the heat-shrinkable sheet between the deformed portions to the binding metal was slightly poor owing to the short excessive length of the sheet to the large diameter portion (in the table, described "Hard to insert ").

When the diameter was 2.5 mm, the workability of No. 1-7 was less preferred as in the case of No. 1-4. Also, in another side edge (cable side) of the heat-shrinkable sheet, a small gap was formed between the objects and the coat in No. 1-7 and No. 1-8.

On the other hand, when the diameter was 3 mm, in No. 1-10 and No. 1-11, because the stainless steel wire was thick and hard, the wire could not be bent to reduce the gap of the deformed portions and the clamping force at the deformed portion could not be sufficiently applied. Thereby, the sheet slipped to move to the side of the object from the deformed portions accompanied by shrinking and thus the object could not be covered adequately. Particularly, the workability of No. 1-10 was unpreferred for the same reason as No. 1-4. Regarding No. 1-12, although the gap of the deformed portions was wide, because the heat-shrinkable sheet was thick, the clamping force in the deformed portions effectively acted and the object could be appropriately covered.

Test Example 2

The workability at inserting the heat-shrinkable sheet into the deformed portions and the profitability of the shrinking property of the cover were determined by carrying out the same coating work as in Test Example 1 by changing the gap in the deformed portions and the angle θ3 of the opening and closing portion. The test conditions and the test results are shown together in Table 2. In addition, the thickness of the heat-shrinkable sheet before shrinking was 1.0 mm and the thickness of the sheet after shrinking was 3.4 mm.

TABLE 2

| No. | Heat-shrinkable sheet Length before shrinking (mm) | Length after shrinking (mm) | Diameter of stainless steel wire (mm) | Gap of the held portion (mm) | Angle (°) | Workability | Shrink-coating property |
| --- | --- | --- | --- | --- | --- | --- | --- |
| 2-1 | 130 | 40 | 2.0 | 0.7 | 3 | Good | Entered inside, NG |
| 2-2 | 130 | 40 | 2.0 | 0.1 | 4 | Good | Entered inside, NG |
| 2-3 | 130 | 40 | 2.0 | 0.1 | 7 | Good | Good |
| 2-4 | 130 | 40 | 2.0 | 0 | 10 | Good | Good |
| 2-5 | 130 | 40 | 2.0 | 0.3 | 10 | Good | Good |
| 2-6 | 130 | 40 | 2.0 | 0.5 | 10 | Good | Good |
| 2-7 | 130 | 40 | 2.0 | 0.7 | 10 | Good | Good |
| 2-8 | 130 | 40 | 2.0 | 0.8 | 10 | Good | Entered inside, NG |
| 2-9 | 130 | 40 | 2.0 | 1.0 | 10 | Good | Entered inside, NG |

As shown in Table 2, when the diameter of the stainless steel wire was 2.0 mm, it was preferred that the gap in the deformed portions was shorter than 0.8 mm. Also, it can be seen that the angle of the opening and closing portion is that case of from 7 to 10°.

Test Example 3

In the case of carrying out covering by the same conditions as in No. 2-5 of Test Example 2, to more securely adhere the heat-shrinkable sheet onto the object to be covered, an adhesive sheet was wound in advance around the portions liable to cause gaps and the heat-shrinkable sheet was covered thereon. In the test example, an adhesive tape made of a thermoplastic adhesive was wound in advance around the connector end portion 21 shown in FIG. 1 and then the heat-shrinkable sheet was covered thereon. Because the length of the connector end portion 21 is short and a difference in level is formed between the portion 21 and the connector 23, it is particularly difficult to cover these portions. After heating the heat-shrinkable sheet, the portion between the connector end portion and the heat-shrinkable sheet was precisely observed. The adhesive spread over the whole periphery of the connector end portion and it was confirmed that the portions were covered without forming gaps.

EXAMPLE 2

Then, the binding metal of the invention using a stainless steel wire of circular arc is explained.

Figure 5:
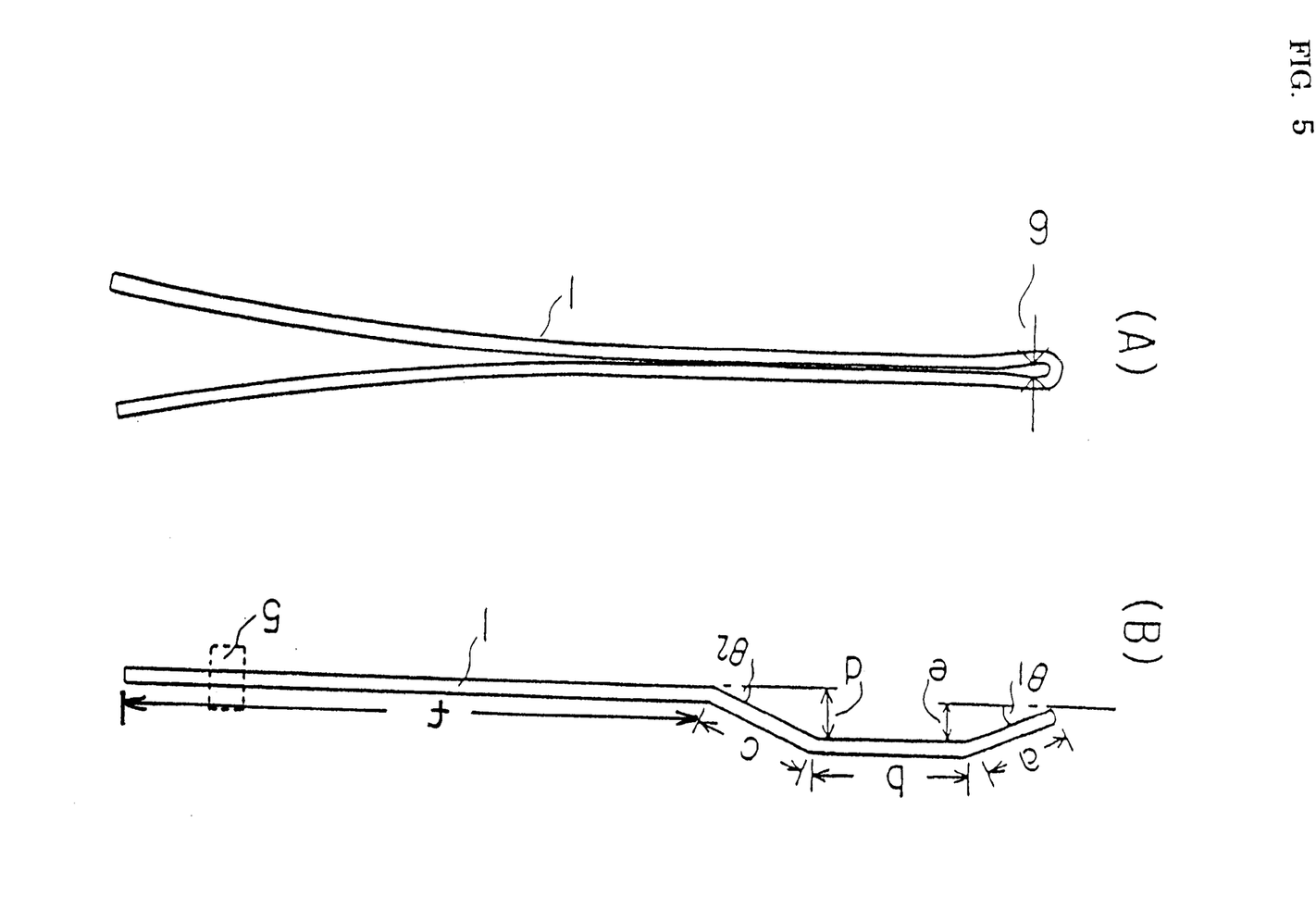
FIG. 5 shows another embodiment of the binding metal of the invention wherein the long members are formed in circular arc.

FIG. 5A is a plain view of the binding metal of the invention and FIG. 5B is a side view thereof. This is formed by bending a stainless steel spring wire of a straight line form into a circular arc and folding the wire at the center thereof in a U-form (a hair pin form) so that the expanded portions of the circular arcs face each other. In the binding metal of FIG. 2, the opening and closing portion 3 is constituted by bending the stainless steel wire at an angle to the deformed portions 2 but in the example, the opening and closing portion 3 is constituted by forming the whole stainless steel wire in a circular arc. In the binding metal of FIG. 2, the four bending steps of "bending of one end portion " "bending of the other end portion " "bending at the center (forming a hair pin form) " "bending of the deformed portion " are required, but the binding metal of FIG. 5 can be produced by three bending steps of "bending in a circular arc " "bending at the center (forming a hair pin form) "bending of the deformed portion".

Because the stainless steel spring wire in the example is folded at the center, the length of each shaft of the opening and closing portion 3 is same.

Figure 2:
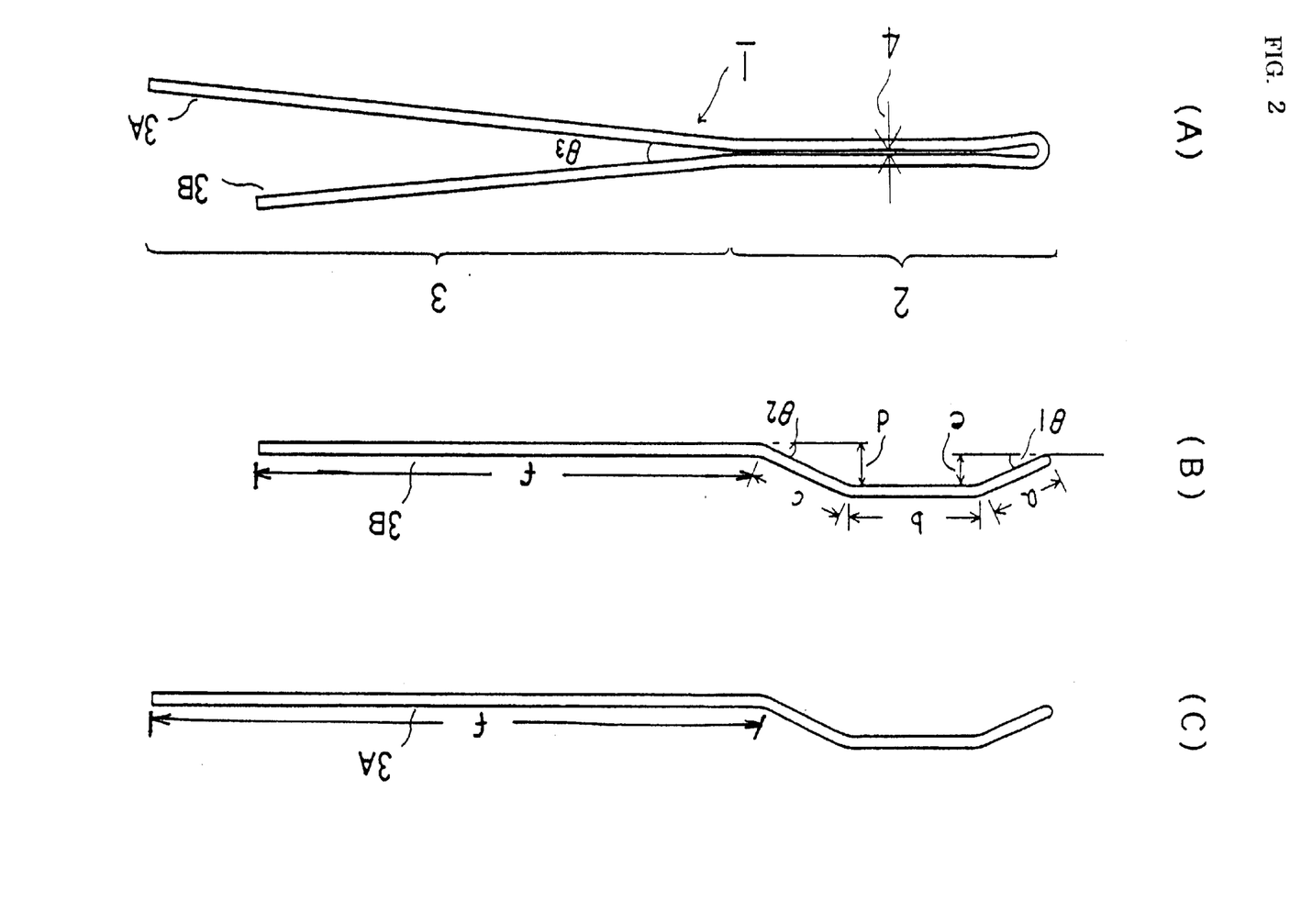
FIG. 2 shows an embodiment of the binding metal of the invention.

Also, the following construction is the same as the binding metal of FIG. 2.

(1) Form of the deformed portion.
(2) The opening and closing portion is always opened in a V-form according to bending in the circular arc.
(3) When the opening and closing portion is closed, the gap between the stainless steel spring wires is clamped.

(4) A small gap 4 is formed in a deformed portion.

(5) At use, a heat-shrinkable sheet is inserted between both stainless steel spring wires and the opening and closing portion is closed.

TEST EXAMPLE 4

The binding metal as shown in FIG. 5 was kept in a closed state and the inside diameter of the ring showing good clamping force was determined. In the test, the clamping extent in the case of inserting a heat-shrinkable sheet in the binding metal was measured by changing the bend radius of the stainless steel spring wire and the inside diameter of a ring. The evaluation of the clamping force was carried out as follows. That is, two sheets, a heat-shrinkable sheet (1) (width 45 mm) and a heat-shrinkable sheet (2) (width 10 mm) each having a different width were held by the binding metal as shown in FIG. 7A, and when a ring 5 was put over the binding metal 1 from the end portion thereof, the gap between both the shafts of the binding metal was measured. In addition, there is considerable clamping force of the portion near the center of the binding metal because both of the shafts are in contact with each other by curving in circular arcs without making both shafts of the binding metal 1 into a closed state by a ring 5. Accordingly, in the test, the sheets are held at the end portions liable to cause rising and the gap between the shafts near the center in this case is measured.

In the test, the binding metal 1 used was formed by a stainless steel spring wire having a length of 300 mm and an outside diameter of ϕ2.0 mm bent at a radius of 400 mm, 650 mm, or 900 mm so that the gap 6 (see, FIG. 5A) became 1.5 ∀0.1 mm and folded at the center. Each of the heat-shrinkable sheets having a thickness of 1.0 mm was folded as in the case of practical covering, and the sheets were held in the binding metal in the folded states.

The test was carried out as follows. First, both heat-shrinkable sheet (1) having a width of 45 mm and the heat-shrinkable sheet (2) having a width of 10 mm were folded. Each of these folded heat-shrinkable sheets was held between the shafts of the binding metal 1 in the state that both end portions of the sheet were faced each other (FIG. 6A). Also, a ring S having an inside diameter of ϕ4.3 mm was put over the binding metal 1 from the end portion thereof and the gap between both shafts near the center of the binding metal was measured. The procedure was repeated in the case of using a ring 5 having an inside diameter of ϕ5.5 mm. The test results are shown in Table 3.

TABLE 3

(Maximum Gap)

| Bend Radius | Inside Diameter of Ring | |
|---|---|---|
| (mm) | ϕ4.3 mm | ϕ5.5 mm |
| 400 | 2.10 mm | 1.81 mm |
| 650 | 2.22 mm | 2.03 mm |
| 900 | 2.13 mm | 1.98 mm |

As shown in Table 3, it can be seen that in the case of using the ring 5 having the inside diameter of ϕ5.5 mm with a slight allowance, the gap is smaller than the case of using the ring having the inside diameter ϕ44.3 mm near the sum total (4.0 mm) of the diameters of the stainless steel spring wires. This is because when the opening and closing portion is closed too tightly, the gap between each of the stainless steel wires in the deformed portion is widened by the thickness of the heat-shrinkable sheet held between the opening and closing portions.

In the plain view (FIG. 2A) of the binding metal of FIG. 2, the deformed portions 2 are almost parallel straight line forms, and the opening and closing portions 3 are bent at an angle to the deformed portions 2, and the opening and closing portions 3 are also nearly straight line forms. The heat-shrinkable sheets held by the binding metal 1 are disposed in the portions between the end portion of the deformed portion 2 and the intermediate of the opening and closing portions 3. When the opening and closing portions are closed, the distance between the stainless steel wires is widened between "the boundary portion of the opening and closing portions and the deformed portion " and "the bent end (the end portion of the deformed portion) and between "the above-described boundary portion " and "the end portion of the opening and closing portion of the sheet ", and occasionally sufficient clamping force cannot be obtained. As a result, the heat-shrinkable sheet is rarely detached from the binding metal 1.

On the other hand, in the binding metal of FIG. 5, the boundary portion of the deformed portion 3 with the opening and closing portion 3 is formed in a continuous circular arc and the occurrence of detaching of the sheet can be completely prevented.

TEST EXAMPLE 5

Using the binding metal shown in FIG. 5, the dispersion of the clamping force in the lengthwise direction of the binding metal was determined. The test determined whether or not the heat-shrinkable sheets could be held when heat-shrinkable sheets A to L each having the same width were held by the binding metal 1 as shown in FIG. 6B.

In the test, the same binding metal as in the above-described test was used. Each of the heat-shrinkable sheets A to L had a width of 10 mm and a thickness of 1.0 mm, and the material thereof was the same as the sheet used in Test Example 1.

The test was carried out as follows. First, each of the heat-shrinkable sheets A to L was folded. Each of these folded heat-shrinkable sheets was held by the binding metal 1 in the state that both end portions faced each other (FIG. 6B). Also, a ring 5 having an inside diameter of ϕ5.5 mm was put over the binding metal 1 from the end portion thereof to maintain the state of closing both shafts. Thereafter, the heat-shrinkable sheets were manually checked by hand to confirm whether or not the sheets were detached. By changing the bend radius of the binding metal, the same test was repeated. The test results are shown in Table 4. The case that clamping was sufficient was evaluated as O, the case that the sheet detached easily as x, and the case that the sheet detached naturally as xx.

TABLE 4

(Clamping Force)

| Bend Radius (mm) | A | B | C | D | E | F | G | H | I | J | K | L |
|---|---|---|---|---|---|---|---|---|---|---|---|---|
| 100 | o | o | o | xx | xx | xx | xx | xx | xx | xx | xx | o |
| 200 | o | o | o | o | o | xx | xx | xx | xx | xx | xx | o |
| 300 | o | o | o | o | o | x | x | x | x | x | o | o |
| 400 | o | o | o | o | o | x | x | o | o | o | o | o |
| 650 | o | o | o | x | x | x | x | x | x | x | o | o |

TABLE 4-continued (Clamping Force)

| Bend Radius (mm) | A | B | C | D | E | F | G | H | I | J | K | L |
|---|---|---|---|---|---|---|---|---|---|---|---|---|
| 900 | o | o | x | x | x | x | x | x | x | o | o | o |
| Infinity | o | o | x | x | x | x | x | x | x | x | o | o |

As shown in Table 4, the clamping force was too strong in the cases of using the binding metals each having the bend radius of 100 mm or 200 mm, and when the binding metal 1 having a circular cross section was used, passing each other occurred and the heat-shrinkable sheet was detached. The term "passing each other" means the state that two stainless steel wires are not placed in parallel on the opening and closing surface of the opening and closing portions and cannot bind the sheet. When passing each other occurs, not only does detaching of the sheet occur but also the folded sheet is heated without adhering the object to be covered, whereby the sheet cannot be adequately shrunk. The best case in the example was using the stainless steel wires having a bend radius of 400 mm.

TEST EXAMPLE 6

From the above-described test results, the reproducibility of the case of covering an object having an irregular portion on the surface thereof was confirmed using the binding metal of FIG. 5. A binding metal 1 formed by bending a stainless steel spring wire having a length of 300 mm and an outside diameter of φ2.0 mm with the bend radius of 400 mm, and folding the stainless steel spring wire at the center thereof such that the gap 4 with width of 1.5 ∀0.1 mm as shown in FIG. 5A was prepared. Also, the deformed portion 2 of the binding metal 1 was formed by deforming the wire as shown in FIG. 5B fitting the form of the CATV connector 22 which was the object to be covered shown in FIG. 1. The dimensions of the portions of the CATV connector and the dimensions of the deformed portions of the binding metal a to e, and θ1 and θ2 are the same as those in Example 1.

The reproducing test was carried out as follows. A heat-shrinkable sheet 10 having a length of 130 mm and a thickness of 1.0 mm was wound round the object to be covered (FIG. 1). The heat-shrinkable sheet 10 functions to shrink the length to 40 mm and thickness to 3.4 mm by heating. In this case, the heat-shrinkable sheet 10 was disposed such that one side edge of the heat-shrinkable sheet 10 was placed at the upper portion of the connector end portion 21 and the other side edge was placed at the upper part of the cable 23, and the heat-shrinking direction coincided with the peripheral direction of the object to be covered. Then, both end portions of the heat-shrinkable sheet 10 faced each other and in such state, the binding metal 1 was put over the heat-shrinkable sheet 19 from one side edge (the side of the CATV instrument) (FIG. 3). The opening and closing portions 3 of the binding metal 1 were opened slightly to widen the deformed portion 2 and the facing heat-shrinkable sheet 10 was held between the deformed portions 2. In this case, the position of the binding metal 1 was adjusted so that the deformed portions 2 were placed at about the upper portion of the CATV connector 22. Also, a ring 5 having an inside diameter of φ5.5 mm was put over the end portion of the binding metal 1 and the opening and closing portions were fixed in a closed state. Then, the heat-shrinkable sheet 10 was shrunk by heating using an electric heater (not shown). As a result, the binding metal 1 did not slip from the heat-shrinkable sheet and was completely adhered to the object to be covered.

As described above, according to the binding metal of the invention and the methods of the invention, the following effects were obtained.

(1) Even an object to be covered having irregular portion(s) on the surface thereof can be covered with a heat-shrinkable sheet without forming gap(s) between the heat-shrinkable sheet and the object.

(2) The heating work of a heat-shrinkable sheet can be carried out without using a clip or a wire, whereby the number of parts can be reduced and workability improved. Particularly, in the binding metal formed by connecting the end portions of two long metal members in a U-form, the binding metal can be mounted on a heat-shrinkable sheet simply by putting it over the heat-shrinkable sheet from the side edges thereof.

(3) By inserting a heat-shrinkable sheet between the metal shafts of a binding metal each having a bend radius, the sheet can be uniformly clamped. In addition, even by selecting a fitment for maintaining the end portions of the binding metal in a closed state, the clamping force can be changed and thus mounting according to a heat-shrinkable sheet is possible. Thereby, the heat-shrinkable sheet can be closely adhered to an object to be covered.

(4) In the production method of a binding metal of the invention, a stainless steel spring wire is bent in a circular arc and then the wire is folded at about the center, thereby lessening the production steps and increasing the economical value and the workability.

What is claimed is:

1. A binding metal for covering an object with a heat-shrinkable sheet, while holding the sheet in the state in which both end portions of the sheet face each other, the binding metal comprising two long members for holding the heat-shrinkable sheet therebetween, the long members being connected to each other at one end so as to form a shape where one of the long members is bent over the other at the joined portion, each long member having a deformed portion conforming substantially to the irregularity in shape of the object to be covered and an elongated portion, the elongated portions of the two long members defining an opening and closing portion in which the elongated portions have a greater distance therebetween than at their ends near to the deformed portions, and which is closable for applying a clamping force to the sheet.

2. The binding metal according to claim 1, wherein at least one end portion of each long member is bent at an angle.

3. The binding metal according to claim 1, wherein each long member is formed in a circular arc.

4. The binding metal according to claim 2, comprising a hooking portion on an end portion of at least one long member in the opening and closing portion for maintaining the opening and closing portion in a closed state by engaging the end portion of the other long member in the opening and closing portion.

5. The binding metal according to claim 3, comprising a hooking portion on an end portion of at least one long member in the opening and closing portion for maintaining the opening and closing portion in a closed state by engaging the end portion of the other long member in the opening and closing portion.

* * * * *